(12) United States Patent
Griffioen et al.

(10) Patent No.: US 8,454,244 B2
(45) Date of Patent: *Jun. 4, 2013

(54) METHOD FOR INSTALLING A COMMUNICATION CABLE ASSEMBLY

(75) Inventors: Willem Griffioen, Ter Aar (NL); Pieter Lock, s Gravenhage (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,764

(22) Filed: May 15, 2012

(65) Prior Publication Data

US 2012/0222301 A1    Sep. 6, 2012

Related U.S. Application Data

(60) Division of application No. 12/685,120, filed on Jan. 11, 2010, now Pat. No. 8,192,092, which is a continuation of application No. 12/200,095, filed on Aug. 28, 2008, now Pat. No. 7,665,902, which is a continuation-in-part of application No. 11/747,573, filed on May 11, 2007, now Pat. No. 7,574,095.

(60) Provisional application No. 60/969,401, filed on Aug. 31, 2007.

(30) Foreign Application Priority Data

May 11, 2006   (NL) ..................... 1031792

(51) Int. Cl.
*G02B 6/36* (2006.01)
*G02B 6/52* (2006.01)

(52) U.S. Cl.
USPC ............................ 385/76; 385/139

(58) Field of Classification Search
USPC .................................................. 385/76, 139
See application file for complete search history.

(56) References Cited

U.S. PATENT DOCUMENTS

| 4,684,161 A | 8/1987 | Egner et al. |
| 4,684,211 A | 8/1987 | Weber et al. |
| 4,815,808 A | 3/1989 | Honma et al. |
| 5,474,277 A | 12/1995 | Griffioen |
| 5,480,203 A | 1/1996 | Favalora et al. |

(Continued)

FOREIGN PATENT DOCUMENTS

| DE | 3605389 A1 | 8/1987 |
| DE | 9409660 U1 | 3/1995 |

(Continued)

OTHER PUBLICATIONS

European Search Report and Written Opinion in counterpart European Application No. 08075719, dated Dec. 22, 2008.

(Continued)

*Primary Examiner* — Omar Rojas
(74) *Attorney, Agent, or Firm* — Summa, Additon & Ashe, P.A.

(57) ABSTRACT

Disclosed is a modified pre-ferrulized cable assembly that facilitates installation of an optical fiber communication cable through narrow cable guides having sharp bends. The pre-ferrulized cable assembly includes a communication cable having a free, front end, a semi-finished communication connector, and a suction plug. The invention further relates to efficient methods for installing the modified pre-ferrulized cable assembly through a cable guide.

17 Claims, 17 Drawing Sheets

U.S. PATENT DOCUMENTS

| | | | |
|---|---|---|---|
| 6,100,470 | A | 8/2000 | Gretz |
| 6,396,993 | B1 | 5/2002 | Giebel et al. |
| 7,574,095 | B2 | 8/2009 | Lock et al. |
| 7,665,902 | B2 * | 2/2010 | Griffioen et al. ............ 385/76 |
| 8,192,092 | B2 | 6/2012 | Griffioen et al. |
| 2001/0014197 | A1 | 8/2001 | De Marchi |
| 2001/0033730 | A1 | 10/2001 | Fentress |
| 2002/0176669 | A1 | 11/2002 | Okamoto |
| 2003/0063868 | A1 | 4/2003 | Fentress |
| 2005/0053342 | A1 | 3/2005 | Melton et al. |
| 2007/0263960 | A1 | 11/2007 | Lock et al. |
| 2008/0317410 | A1 | 12/2008 | Griffioen et al. |
| 2010/0111479 | A1 | 5/2010 | Griffioen et al. |

FOREIGN PATENT DOCUMENTS

| | | |
|---|---|---|
| DE | 29505241 U1 | 7/1996 |
| DE | 102004019805 A1 | 11/2005 |
| EP | 1855134 A2 | 11/2007 |
| EP | 2031719 A1 | 3/2009 |
| FR | 2677820 A1 | 12/1992 |
| GB | 2289805 A | 11/1995 |

OTHER PUBLICATIONS

Dutch Search Report for commonly owned Dutch Application No. 1031792, completed on Jan. 26, 2007 [corresponding to U.S. Appl. No. 11/747,573].

European Search Report and Written Opinion in commonly owned European Application No. 07009425, dated Jan. 30, 2009 [corresponding to U.S. Appl. No. 11/747,573].

Griffioen, et al., "Preferrulized Cables for Blowing to Homes through 4/3 mm Microducts", Draka Comteq Cable Solutions, Gouda, Netherlands (Nov. 2007).

U.S. Appl. No. 60/969,401, filed Aug. 31, 2007 [priority application; cited in specification].

European Office Action in counterpart European Application No. 07009425 dated May 15, 2012, pp. 1-5.

Chinese Office Action in counterpart Chinese Application No. 200810214652.X dated Jul. 29, 2011, pp. 1-7.

English translation of Chinese Office Action in counterpart Chinese Application No. 200810214652.X dated Jul. 29, 2011, pp. 1-6.

* cited by examiner

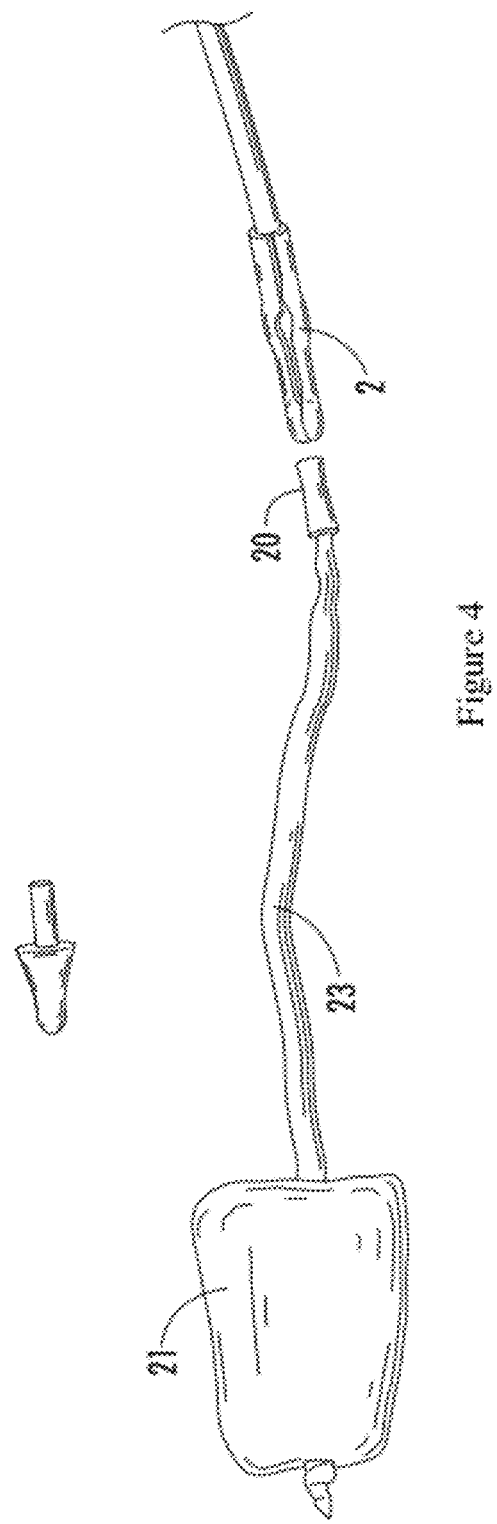

METHOD FOR INSTALLING A COMMUNICATION CABLE ASSEMBLY

CROSS-REFERENCE TO PRIORITY APPLICATIONS

This application is a division of commonly assigned U.S. patent application Ser. No. 12/685,120 for a Modified Pre-Ferrulized Communication Cable Assembly and Installation Method (filed Jan. 11, 2010, and published May 6, 2010, as U.S. Patent Application Publication No. 2010/0111479 A1), which itself is a continuation of commonly assigned U.S. patent application Ser. No. 12/200,095 for a Modified Pre-Ferrulized Communication Cable Assembly and Installation Method (filed Aug. 28, 2008, and published Dec. 25, 2008, as U.S. Patent Application Publication No. 2008/0317410 A1), now U.S. Pat. No. 7,665,902.

Parent U.S. patent application Ser. No. 12/200,095 is a continuation-in-part of U.S. patent application Ser. No. 11/747,573, for a Communication Cable Assembly and Installation Method (filed May 11, 2007, and published Nov. 15, 2007, as U.S. Patent Application Publication No. 2007/0263960 A1), now U.S. Pat. No. 7,574,095, which itself claims the benefit of Dutch Application No. 1,031,792 (filed May 11, 2006, at the Dutch Patent Office).

Parent U.S. patent application Ser. No. 12/200,095 further claims the benefit of U.S. Provisional Patent Application No. 60/969,401, for a Modified Pre-Ferrulized Communication Cable Assembly and Installation Method (filed Aug. 31, 2007).

Each of the foregoing commonly assigned patents, patent application publications, and patent applications is hereby incorporated by reference in its entirety.

FIELD OF THE INVENTION

The invention relates to a pre-ferrulized communication cable assembly that can be readily passed through a cable guide from a starting position to an end position. The pre-ferrulized cable assembly includes a communication cable having a free, front end, a semi-finished communication connector, and a suction plug. The invention further relates to an efficient method of passing the pre-ferrulized cable assembly through narrow cable guides having sharp bends.

BACKGROUND OF THE INVENTION

When optical fiber networks are installed, the network includes several connections for connecting the various end users. Various techniques are used for connecting the optical fiber from the main network to the homes of end users.

One such technique is leading the communication cable through to the end user's location, after which a so-called communication connector is fitted to the free end in situ. This is not an advisable technique, however, because it is necessary to expose the optical fiber by removing the cable sheath, to mount the exposed optical fiber end in the connector, and to polish the end face of the optical fiber so as to enable a good signal transmission.

In another technique, the cable assembly, including a communication cable provided with a communication connector, is passed through the cable guide to the end position as a pre-prepared assembly. The connector, which is likewise passed through the cable guide, has considerable diameter dimensions in comparison with the communication cable, making it necessary to install comparatively wide cable guides in the ground. In addition, it is difficult to pass such a cable assembly (i.e., having a complete connector mounted to the free, front end of the communication cable) through the cable guide. More specifically, the cable assembly must be passed through the cable guide from the starting position to its end position. This makes it necessary to carry out operations at the end position (e.g., in the end user's home), which is undesirable in view of the extent of planning and the man-hours involved.

In yet another, improved technique disclosed in commonly owned U.S. patent application Ser. No. 11/747,573 and its counterpart Dutch Application No. 1,031,792, a semi-finished cable assembly (i.e., a pre-fabricated, semi-finished connector secured to a communication cable) is capable of passing through cable guides having a small diameter (i.e., cable guides that are simply too small to permit passage of finished cable assemblies as described previously). This facilitates the passage of semi-finished cable assemblies from a central point to various end users in a way that the remaining connector can be easily mounted. This improved technique of cable installation significantly reduces labor costs. Despite the installation efficiencies of the cable assemblies disclosed in U.S. patent application Ser. No. 11/747,573, passage of a partially completed cable assembly remains difficult, if not impossible, through sharp bends in narrow cable guides.

Accordingly, it would be desirable to overcome the drawbacks of the known installation techniques by providing an improved, pre-ferrulized cable assembly that is capable of ready installation through narrow cable guides, even those having sharp bends.

SUMMARY OF THE INVENTION

Thus, it is an object of the present invention to provide a novel, pre-ferrulized cable assembly (e.g., a partially finished, rigid cable assembly further including a suction plug) that can pass through narrow cable guides having sharp bends, such as cable guides running through electrical wall boxes. This may be achieved, for example, by flexibly affixing a suction plug to the semi-finished cable assembly disclosed in U.S. patent application Ser. No. 11/747,573 prior to passage through a cable guide. (U.S. patent application Ser. No. 11/747,573 is hereby incorporated by reference in its entirety.)

The pre-ferrulized cable assembly is characterized in that, to make it possible to pass the communication cable through narrow cable guide, the optical fiber is exposed at the free, front end of the communication cable. This free end of the cable is fixedly surrounded by a connecting element, which can be mechanically connected to one or more complementary sleeves to complete the communication connector after the communication cable has been passed through the cable guide from a start position to an end position.

Thus, the completed communication connector (i.e., a semi-finished connector and a complementary connector) can be connected in communicative contact to the optical fiber by way of a simple mechanical operation after the cable assembly has been led to the end position. No complex and costly finishing operations (e.g., polishing) need to be carried out at the end user's location.

As an example, a suitable semi-finished connector for use according to the invention is a compact and sturdy Small Form Factor (SFF) ferrule (i.e., the semi-finished connector), which can be blown or pushed through narrow cable guides (e.g., cable guides having an outside diameter of about four millimeters and inside diameter of about three millimeters). This semi-finished connector can be connected to the remaining connector by a non-expert in the field within a few minutes as an LC compliant (1.25-millimeter ferrule) connector. Those of ordinary skill in the art will appreciate that such a semi-finished connector is thus practical for FttH installations.

In testing the pre-ferrulized cable assemblies of the present invention, communication cables containing standard G652 D fibers and Single Mode PC connectors were used.

The completed communication connectors installed by the method of the present invention (i.e., after the installation of the final cable assembly) typically showed insertion loss of less than about 0.5 decibel (and typically about 0.25 decibel) and a minimum return loss of about 45 decibels. Those having ordinary skill in the art will appreciate that such results demonstrate an advanced communication connector and installation technique.

In accordance with the present invention, the pre-ferrulized cable assembly embraces a spring element that may be positioned around the optical fiber between the connecting element and the cable sheath(s). The spring element may be retained by the connecting element and a retaining sleeve arranged around the optical fiber. In this way, any loads exerted on the end faces of an optical fiber and the connecting element can be absorbed by the compression of the spring element, thus preventing damage to the connecting element and/or the optical fiber.

The completed communication connector of the present invention has two primary components, the semi-finished connector (i.e., the connecting element and, optionally, the spring element that form a part of the pre-ferrulized cable assembly) and a complementary/snap-on connector (i.e., one or more complementary sleeves that are mechanically connected to the semi-finished connector after the communication cable has been passed through the cable guide).

The connecting element may be provided with at least one recess in its circumferential surface. This recess may be configured as a circular recess formed in the circumferential surface in a special embodiment.

According to the invention, to make it easier to pass the pre-ferrulized cable assembly through the cable guide, the semi-finished connector portion of the pre-ferrulized cable assembly may be protected by a protective element that is removably positioned at the free end of the communication cable. As herein described, this protective element can be incorporated into a plug assembly that includes a suction plug.

Semi-finished cable assemblies are sometimes unable to pass through a bend in a narrow cable guide. For example, when a semi-finished cable assembly passes through a bent section of a cable guide (e.g., a microduct) with inner diameter D (see FIG. 1), the bend radius of the latter cannot drop below a certain minimum value $R_b$ depending on the length/ and diameter d of the substantially rigid portion of the semi-finished cable assembly (e.g., the ferrule). The $R_b$ value is calculated using the following equation:

$$R_b = \frac{\left(\frac{1}{2}l\right)^2 + (D-d)^2}{2(D-d)}$$

It follows that the ferrule depicted in FIG. 1, which has a length of 22 millimeters and a diameter of 2.2 millimeters (including its metal holder), cannot pass bends in a cable guide having an outside diameter of about 4 millimeters and inside diameter of about 3 millimeters (e.g., having a millimeter diameter ratio of about 4/3) with bend radius smaller than 75 millimeters. For cable guides having millimeter diameter ratios of 5/3.5 and 5/4, the minimum bend radii are 50 and 35 millimeters, respectively.

It should be noted that the illustrative ferrule depicted in FIG. 1 has a constant length and a diameter. In general and for purposes of the $R_b$-value equation, the maximum length and maximum diameter of the substantially rigid portion of a semi-finished cable assembly is used. Moreover, for purposes of the $R_b$-value equation the cable itself is disregarded (i.e., the substantially rigid portion of a semi-finished cable assembly is deemed not to include the cable itself). It is not believed that these simplifying assumptions distort the meaningful calculation of the predicted minimum bend radius $R_b$.

During testing, it was observed that cable guides having an outside diameter of about 4 millimeters and inside diameter of about 3 millimeters could possess a bend radius as small as 35 millimeters, yet the ferrule depicted in FIG. 1 could not pass through electrical wall boxes with bend radius smaller than 75 millimeters. This presented an installation problem. Previously, to overcome this problem cable guides were temporarily allowed to hang from wall boxes during the cable installation process. This increased the minimum bend radius encountered by the ferrule depicted in FIG. 1, thereby facilitating cable installation (i.e., cable blowing). After installation, the cable guides were repositioned within the cramped wall boxes.

To facilitate cable installation through a cable guide having a tight bend radius, the pre-ferrulized cable assembly according to the present invention includes a suction plug attached to the semi-finished connector (and/or a protective element surrounding the semi-finished connector). This suction plug facilitates the passage of the pre-ferrulized cable assembly through sharp bends (e.g., the cable guides running through electrical wall boxes) in narrow cable guides. The substantially rigid portion of an exemplary pre-ferrulized cable assembly (i.e., essentially the semi-finished connector and its protective cap) has a maximum length of 22 millimeters and a maximum diameter of 2.2 millimeters. This pre-ferrulized cable assembly (including air suction plug) can pass through cable guides having an outside diameter of about 4 millimeters and inside diameter of about 3 millimeters with bend radius of at least about 35 millimeter. Thus, the communication cables attached to semi-finished connectors as in the present invention have similar installation capacity as is observed with bare cables (i.e., cables that are not attached to communication connectors) with short conical end-cap.

The suction plug of the present invention can be relatively airtight or leaky. For instance, when employing a pulling plug with a leaking aperture, the high-speed airflow partly continues around the pulling plug and partly provides a pulling force. Such a leaking pulling plug is disclosed in U.S. Pat. No. 5,474,277, which is hereby incorporated entirely herein by reference. In general, although an airtight suction plug provides greater pulling force, a leaky suction plug provides better performance over longer installation distances.

According to the invention, the communication connector may include at least one sleeve that is positioned at (e.g., provided around) the connecting element for use in the final assembly of the cable assembly.

To facilitate the final assembly at the end position, the sleeve may be made up of two or more sleeve elements to be positioned at (e.g., provided around) the connecting element.

In a specific embodiment, for example, the sleeve may be provided with first and second cams that are spaced apart from one another and that extend toward the connecting element, with the first cam engaging in the recess formed in the connecting element and the second cam engaging the spring element.

A good mechanical connection of the connecting element to the sleeve or sleeve elements is obtained in this way. In addition, compression of the connecting element (e.g., as a result of a force being exerted on the end face) can be absorbed by the compression of the spring element.

In another specific embodiment, the second cam mates with a cam present on the retaining sleeve.

In order to absorb forces being exerted on the end face of the connecting element through compression of the spring element and movement of the sleeve, the length of the recess is typically greater than the length of the first cam as measured in the longitudinal direction of the cable.

The communication connector includes a connector housing positioned at the sleeve (e.g., around the sleeve) to facilitate further assembly operations.

According to the invention, to achieve proper retention and to prevent the connector housing from undesirably becoming detached from the sleeve, the connector housing includes a cam extending toward the sleeve. The cam engages in a recess formed in the outer circumference of the sleeve.

As noted, the pre-ferrulized cable assembly according to the present invention is modified to include a suction plug, which is flexibly attached to the substantially rigid, semi-finished connector (and/or a protective element surrounding the semi-finished connector). Those having ordinary skill in the art will appreciate that the substantially rigid portion of the pre-ferrulized cable assembly includes the semi-finished connector its protective cap (i.e., the protective element).

In this regard, this rigid portion of the pre-ferrulized cable assembly typically has a maximum diameter between about 60 and 95 percent of the inner diameter of the cable guide and, more typically, between about 70 and 85 percent of the inner diameter of the cable guide.

Moreover, this rigid portion of the pre-ferrulized cable assembly typically has a maximum diameter that is less than 200 percent of the diameter of the communication cable, and typically less than 150 percent of the diameter of the communication cable (e.g., 120 percent or less).

The maximum diameter of the communication cable provided with the connecting element is less than or equal to the diameter of the rigid portion of the pre-ferrulized cable assembly. To facilitate installation of the pre-ferrulized cable assembly, the diameter of the connecting element can match or be less than the diameter of the communication cable.

Furthermore, in other embodiments, the length of the rigid portion of the pre-ferrulized cable assembly is less than about ten times (10×) its maximum diameter, typically less than eight times (8×) its maximum diameter, and more typically less than six times (6×) its maximum diameter.

With the foregoing constructional dimensions, a proper and unhampered displacement of the pre-ferrulized cable assembly through the cable guide is possible even passing sharp bends in the cable guide.

To facilitate installation of the modified pre-ferrulized cable assembly according to the present invention (i.e., including a plug assembly), a device for collecting the front end of the pre-ferrulized cable assembly may be used. Such a device includes an enclosure to be positioned at the end position of the cable guide, the enclosure being provided with one or more ventilation openings.

This facilitates the collection of the free, front end of the pre-ferrulized cable assembly when it is guided through the cable guide with the aid of a transfer medium (e.g., gas or liquid). More particularly, the enclosure is configured as a tube-shaped element having a first and second open end, wherein the first open end is provided with a collar-shaped clamp for coupling with the end position of the cable guide. This allows a quick and secure coupling and uncoupling of the device to the cable guide at the premises of the end user (i.e., where the pre-ferrulized cable assembly is to be installed by connecting it with the complementary connector).

In a further embodiment, the second open end is provided with a closure cap, which functions as an end stop for the free, front end of the pre-ferrulized cable assembly upon its emergence from the cable guide.

Moreover, the modified pre-ferrulized cable assembly according to the present invention (i.e., including a plug assembly) can be used with a transfer fluid or when water is present in the cable guide (e.g., as a result of leaking or diffusion). Thus, in a further improved embodiment, the device includes a collecting chamber that accommodates the enclosure, the collecting chamber serving to collect the transfer medium that is used in passing the pre-ferrulized cable assembly through the cable guide.

The invention further embraces methods for installing a pre-ferrulized cable assembly, such as a communication cable having a free end and that is built up of at least an optical fiber, which is coaxially surrounded by at least one cable sheath. The exemplary method includes the steps of: (i) providing a cable guide having a starting point and an end point located at an end users home; (ii) guiding the pre-ferrulized cable assembly with the optical fiber being exposed at the free, front end of the cable, which end is fixedly surrounded by a connecting element, from the starting point toward the end point using a transfer medium; (iii) collecting the free, front end of the pre-ferrulized cable assembly at the end point; and (iv) mechanically connecting the free, front end of the semi-finished cable assembly to one or more complementary sleeves to thereby complete the communication connector. Optionally, step (iii) further includes the step of collecting (at the end point) the transfer fluid employed (or water that is simply present) during the guiding (e.g., blowing) of the cable assembly through the cable guide as set forth in step (ii).

In accordance with the foregoing, FIGS. 2A-C illustrate the ease of attaching the complementary connector to the semi-finished connector embraced by the present invention. (These photographs, although taken during testing in which installation of the cable assembly was not facilitated using a suction plug, are nonetheless illustrative of the final assembly of the finished communication connector in accordance with the present invention.) A semi-finished cable assembly, similar to that shown, is blown until the end of the cable guide is reached (with air-venting and end-stop). At this point, the suction plug and end cap (i.e., protective element) are removed. Next, the cable boot and a metal cylinder (i.e., sleeves) are sleeved over the ferrule (i.e., the semi-finished connector). The metal cylinder is then crimped around the ferrule and the cable jacket using a crimp tool for extra strength. See FIG. 2A. Thereafter, the ferrule is pushed into the connector housing, which is positioned in a holder to simplify this connection. See FIG. 2B. Finally, the cable boot is pushed over the metal cylinder thereby completing the connection of the communication connector.

The pre-ferrulized cable assemblies of the present invention not only reduce the time and effort required to install optical cables in an end user's home, but also reduce the need for subsequent home visits. Blowing of the pre-ferrulized cable assemblies of the present invention through narrow cable guides (e.g., a cable guide having an outside diameter of about 4 millimeters and inside diameter of about 3 millimeters) is possible even for cable guides longer than 1,000 meters.

The foregoing, as well as other objectives and advantages of the invention, and the manner in which the same are accomplished, are further specified within the following detailed description and its accompanying drawings.

BRIEF DESCRIPTION OF THE DRAWINGS

FIG. 4 shows a prototype pre-ferrulized cable assembly according to the present invention.

DETAILED DESCRIPTION

The present invention is described herein with reference to the accompanying drawings. As will be appreciated by those having ordinary skill in the art, these drawings are schematic representations, which are not necessarily drawn to scale. This invention may be embodied in many different forms and should not be construed as limited to the embodiments set forth herein. The embodiments disclosed are provided to convey the scope of the invention to those having ordinary skill in the relevant art. In this regard, like parts will be indicated by the same numerals in the accompanying drawings and following description.

Figure 1:
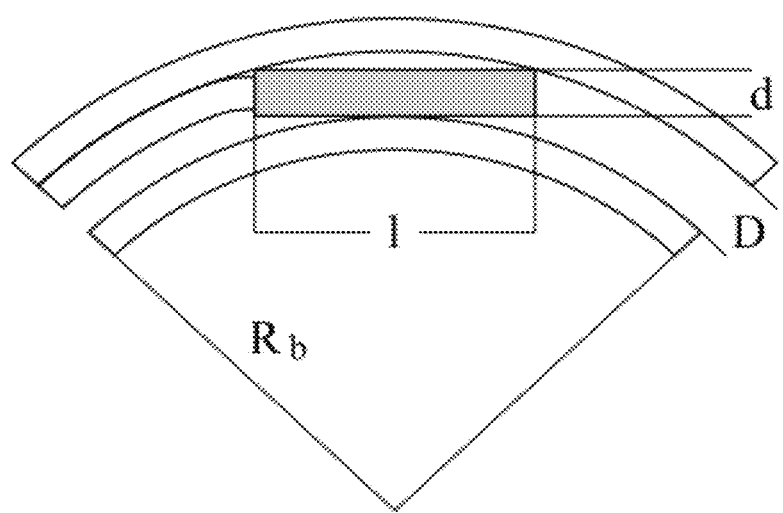
FIG. 1 is a schematic view of a ferrule connected to a cable in a section of bent cable guide.
Figure 2A:
FIGS. 2A-C illustrate the mechanical connection of a complementary connector to a semi-finished connector thereby completing a communication connector.
Figure 2B:
Figure 2C:
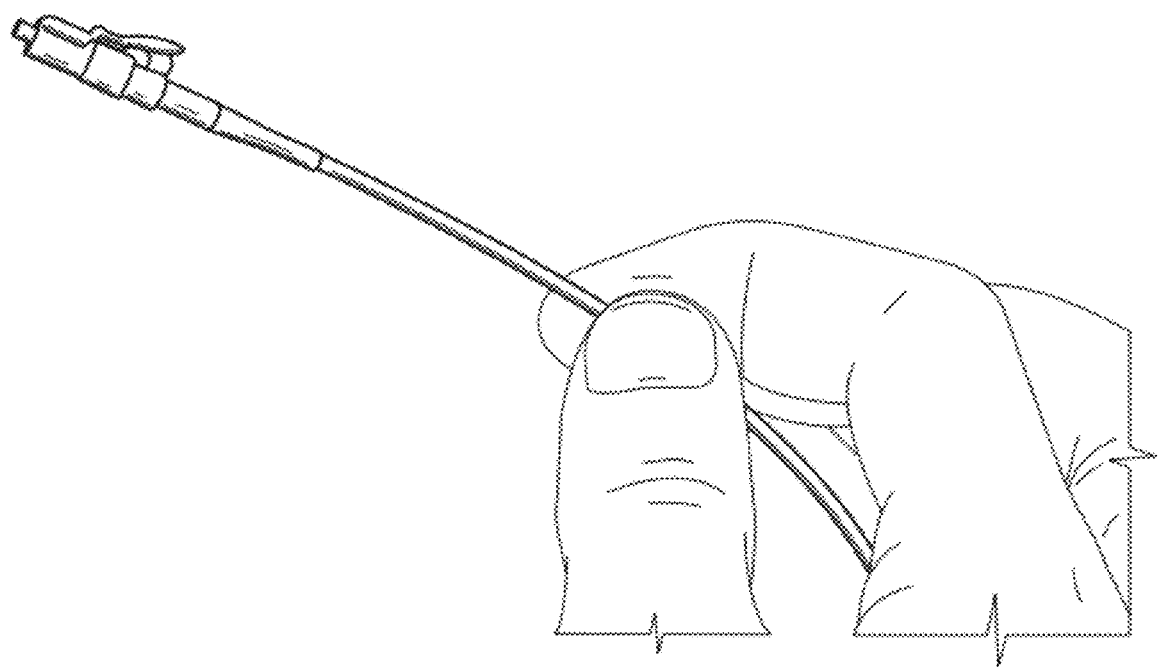
Figure 3A:
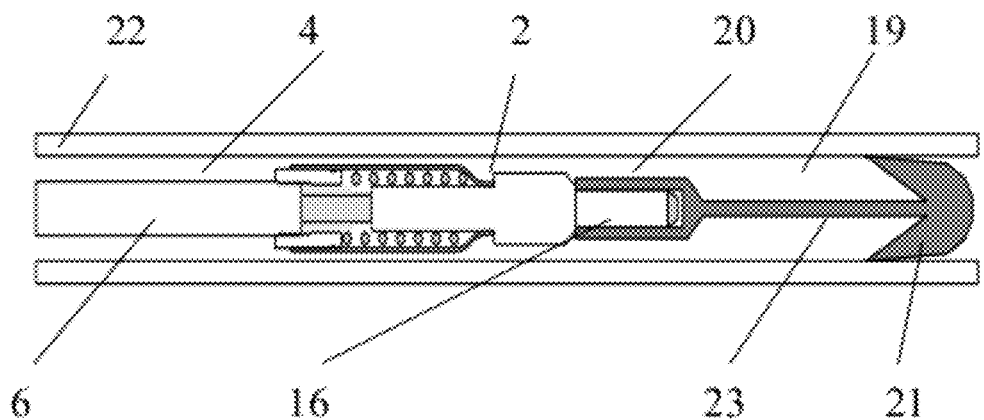
FIG. 3A depicts a pre-ferrulized cable assembly (with an airtight suction plug) according to the present invention.
Figure 3B:
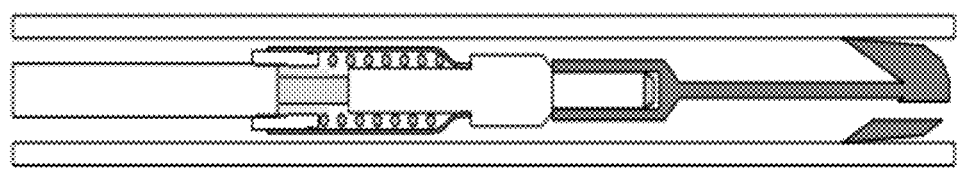
FIG. 3B depicts a pre-ferrulized cable assembly (with a leaky suction plug) according to the present invention.
Figure 3C:
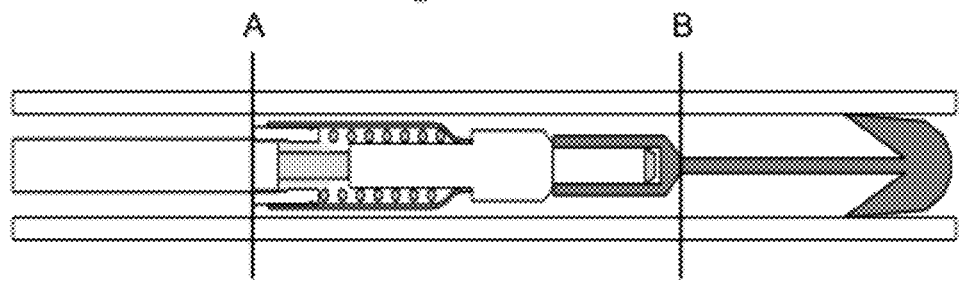
FIG. 3C depicts the substantially rigid portion (A-B) of a pre-ferrulized cable assembly according to the present invention.

The present invention embraces a partially finished, rigid cable assembly that is modified with a suction plug. The inclusion of a suction plug promotes passage of the pre-ferrulized cable assembly through even narrow cable guides having sharp bends, thereby facilitating installation of an optical fiber communication cable. Exemplary modified pre-ferrulized cable assemblies are schematically depicted in FIG. 3A (having an airtight suction plug) and FIG. 3B (having a leaky suction plug). FIG. 3C schematically identifies (i.e., between line A and line B) the substantially rigid portion of a pre-ferrulized cable assembly according to the present invention. A prototype pre-ferrulized cable assembly according to the present invention is shown in FIG. 4.

Accordingly, in one aspect, the modified pre-ferrulized cable assembly includes a communication cable 6 that includes at least one cable sheath coaxially surrounding an optical fiber. The cable sheath typically includes at least one strain-relieving element. A semi-finished connector 2, which includes a connecting element 16, is secured to the free, front end of the communication cable 4. This semi-finished connector 2 is in communicative contact with the optical fiber.

The modified pre-ferrulized cable assembly further includes a plug assembly 19, which includes a suction plug 21 (e.g., a suction pig) and, optionally, a protective element 20 (i.e., a cap that protects the semi-finished connector 2). Stated otherwise, a plug assembly 19 embraces the suction plug 21 with or without the protective element 20. The suction plug 21 is secured to the communication cable 6 and/or the semi-finished connector 2 by a flexible cord 23 or other flexible attachment section and, optionally, the protective element 20. Where present, the protective element 20 and the suction plug 21 may be removably connected via the flexible cord 23 or, as depicted in FIGS. 3A and 3B, fixedly attached via the flexible cord 23. The flexible cord 23 may be formed of any suitable material that is both strong and flexible.

The pre-ferrulized cable assembly is passed (e.g., blown) through the cable guide 22 to its destination (e.g., an end user's meter cupboard). Thereafter, the plug assembly 19 is detached of otherwise removed from the modified pre-ferrulized cable assembly. The connecting element 16 may then be mechanically connected to a complementary connector (not shown here) to form a completed communication connector.

Those having ordinary skill in the art will appreciate that the force necessary to remove the plug assembly 19 (i.e., the suction plug 21, the flexible cord 23, and, optionally, the protective element 20) should be sufficient to prevent the plug assembly 19 from blowing off when air suction is applied (i.e., during installation of the pre-ferrulized cable assembly) but not so great that the removal of the plug assembly 19 might break the semi-finished communication connector 2.

Figures 5A, 5B, 5C:
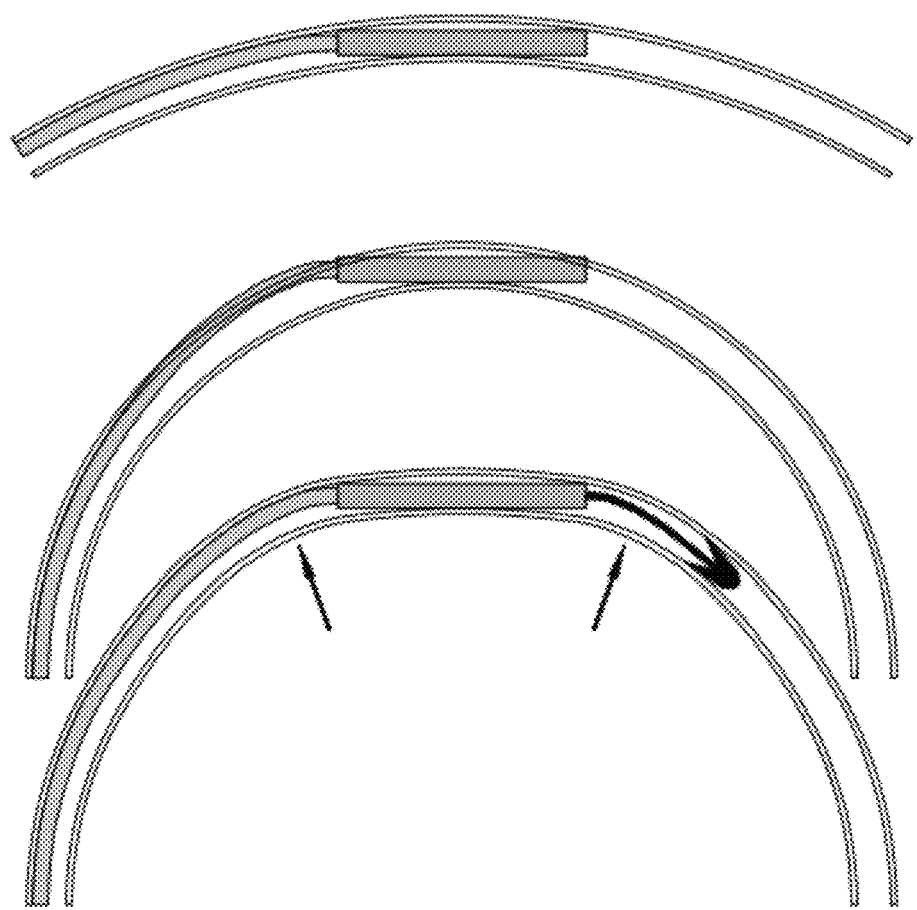
FIG. 5A depicts a successful installation of a semi-finished cable assembly without the use of a suction plug.
FIG. 5B depicts an unsuccessful installation of a semi-finished cable assembly without the use of a suction plug.
FIG. 5C depicts an installation of a pre-ferrulized cable assembly (including a suction plug) according to the invention

Without the use of a suction plug 21, the installation of a semi-finished cable assembly through a cable guide 22 works well at larger bend radii but becomes impractical, if not impossible, at smaller bend radii. This is schematically depicted in FIGS. 5A and 5B, respectively.

Surprisingly, it has been discovered that the inclusion of a plug assembly 19 promotes local deformation of a cable guide 22 (i.e., a microduct) during installation of the pre-ferrulized cable assembly through tight microduct curves. In particular, the suction plug 21 was observed to deform the cable guide 22 at relatively tight bends, thereby facilitating the movement of the semi-finished communication connector 2 and communication cable 6 through the cable guide 22. This unexpected result is schematically depicted in FIG. 5C—the deformation of the cable guide 22 is indicated by the two arrows.

As a practical matter, this means that it is now possible to pass semi-finished cable assemblies through cable guides 22 having substantially lower diameters (and/or substantially lower bend radii). Indeed, the pre-ferrulized cable assembly has been found to pass through a bend radius that is significantly less than predicted (e.g., less than 75 percent of the predicted minimum bend radius, $R_b$ and, in some instances, less than 50 percent of the predicted minimum bend radius, $R_b$).

Using the pre-ferrulized cable assembly according to the invention, a semi-finished communication connector 2 can be passed through a cable guide 22 together with the communication cable 6 in an effective manner, by using an air suction plug 21 and exerting a pulling or pushing force, which may or may not be provided by a fluid medium (e.g., a gas) under pressure. In this way, no complex assembly operations need to be carried out at the end position.

As noted and by way of example, the pre-ferrulized cable assembly according to the present invention may be achieved by securing a suction plug 21 to a semi-finished cable assembly disclosed in U.S. patent application Ser. No. 11/747,573. Accordingly, the following discussion of the various semi-finished cable assemblies disclosed therein will enable those having ordinary skill in the art to modify those structures to achieve pre-ferrulized cable assemblies according to the present invention.

Figure 6:
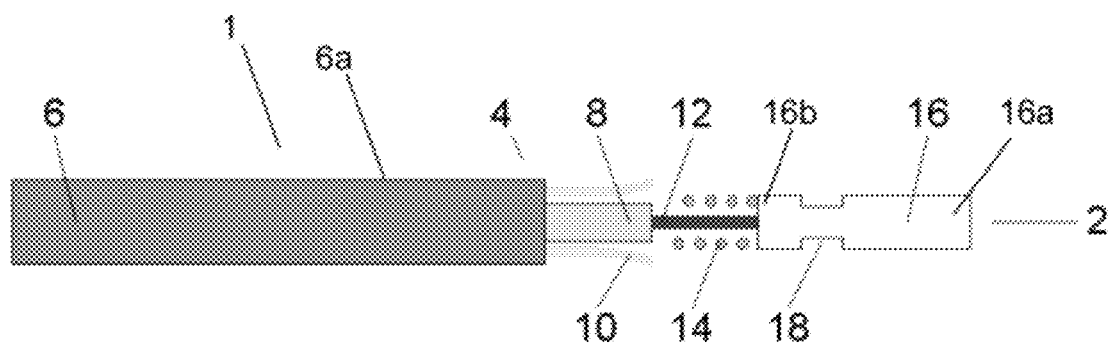
FIG. 6 depicts an embodiment of a semi-finished cable assembly.

In this regard, FIG. 6 depicts one semi-finished cable assembly 1 disclosed in pending U.S. patent application Ser. No. 11/747,573. This cable assembly 1 is built up of a communication cable 6 that has a free, front end 4. The communication cable 6 can be passed through a cable guide (not shown) to an end position via its free end 4. The communication cable 6 stops when the end position of the cable guide is reached (i.e., due to air-venting end-stop).

The communication cable 6 includes at least an optical fiber 12, which is coaxially surrounded by at least one cable sheath 6a as well as a strain-relieving sheath 10. In this embodiment, a buffer sheath 8 is provided around the optical fiber 12.

To make it easier to pass the communication cable 6 through the cable guide (not shown), the optical fiber 12 is exposed at the free, front end 4 of the cable 6. The free, front end 4 is fixedly surrounded by a connecting element 16. The connecting element 16 has a front-end face 16a and a back-end face 16b, which is in contact with the optical fiber 12. The front-end face 16a is centrally provided with a polished glass fiber surface, which can be placed into communication with a similar polished surface of a counter connector (not shown). In this regard and by way of example, the front-end face 16a can be polished under an angle (i.e., an Angle Polished Connector or APC).

The connecting element 16 is provided with at least one recess 18, which is typically configured as a circular recess formed in the circumferential surface of the connecting element 16. (The function of the recess 18 will be further explained herein.) As depicted in FIG. 6, a spring element 14 is arranged around the optical fiber 12 between the connecting element 16 and the cable sheaths 8, 10, 6a. When the connecting element 16 is fully assembled, the spring element 14 functions to press the polished glass fiber surfaces together with sufficient force—but not too much force as mechanical stresses may lead to cracking of the glass material—upon connection with a counter connector so as to effect a physical contact with a minimal optical signal attenuation of the connector connection.

The connecting element 16 and the spring element 14 form part of a semi-finished communication connector 2 (i.e., the semi-finished component of a communication connector).

The semi-finished cable assembly 1 depicted in FIG. 6 is passed through a cable guide (not shown) in the direction of an end position from a central distribution point. At the end position, final assembly of the semi-finished communication connector 2 takes place so that the semi-finished cable assembly 1 is attached to the complementary connector and thus used for communication applications. In other words, the communication connector is completed by attaching the semi-finished component, which includes the connecting element 16, with a complementary component, which includes one or more sleeves (e.g., a connector sleeve 28).

Figure 7:
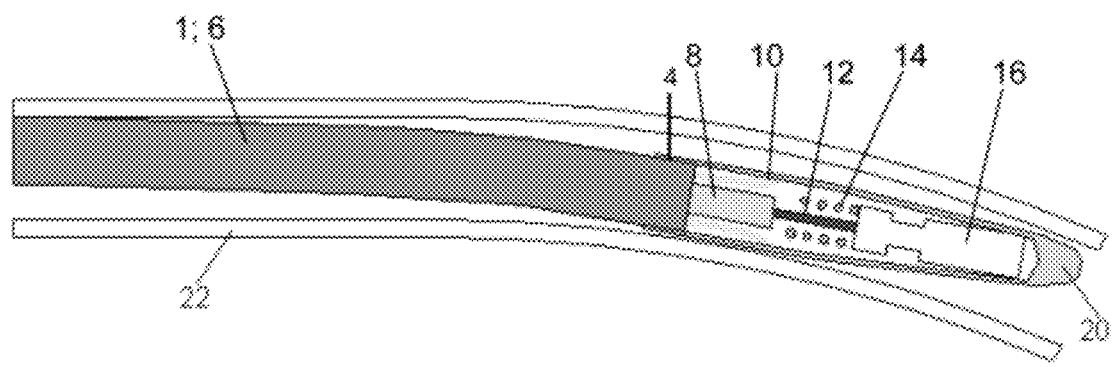
FIG. 7 depicts the installation of the semi-finished cable assembly of FIG. 6.

As depicted in FIG. 7, the semi-finished cable assembly 1 is passed through an underground cable guide 22 (e.g., a cable conduit). To protect the components of the semi-finished communication connector 2 (e.g., the connecting element 16 and the spring element 14), a protective element 20 is used to pass the semi-finished cable assembly through the cable guide 22. Protective element 20 protects the free end 4 of the semi-finished cable assembly 1 as well as the connecting element 16 and the spring element 14. See FIG. 7.

The protective element 20 is removable in this embodiment. After the semi-finished cable assembly has been passed through the cable guide 22 to the end position (e.g., an end user's meter cupboard), the protective element 20 must be removed, whereupon the final assembly of the semi-finished communication connector 2 (at this stage, made up of the connecting element 16 and the spring element 14) is to take place.

After the semi-finished cable assembly has been passed through the cable guide 22 to the end position (e.g., an end user's meter cupboard), the plug assembly must be removed, whereupon the final assembly of the semi-finished communication connector 2 (at this stage, made up of the connecting element 16 and the spring element 14) is to take place.

Upon final assembly and mounting of the communication connector 2, a kink protector 24 is slipped over the cable assembly 1. See FIGS. 8-10. Then, a shrink sleeve 26 is fitted around the outer cable sheath 6a, after which the connecting element 16 and the spring element 14 are protected by a connector housing (e.g., a connector sleeve 28). In the embodiment shown in FIG. 8, the connector sleeve 28 is built up of two sleeve elements 28a-28b, which can be fitted together over the connecting element 16 and the spring element 14 by way of a clamped connection or a snap connection.

Figure 8:
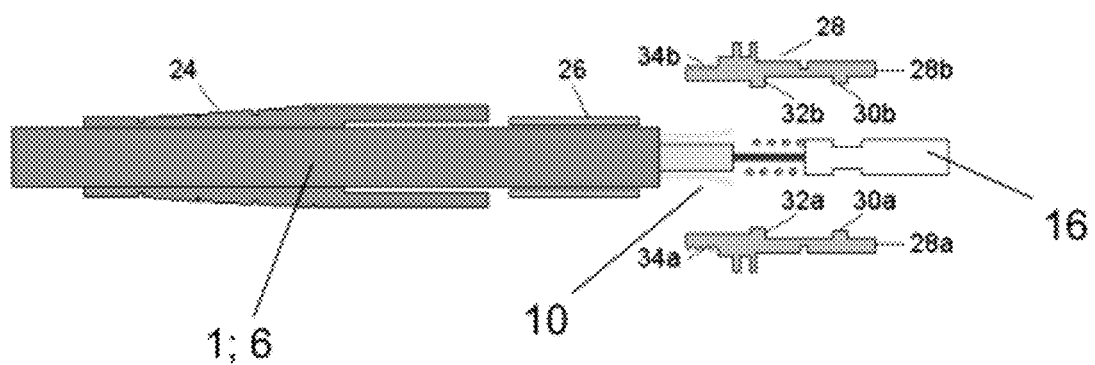
FIG. 8 depicts a first configuration of a cable assembly in the end position (i.e., placed for end use).
Figure 9:
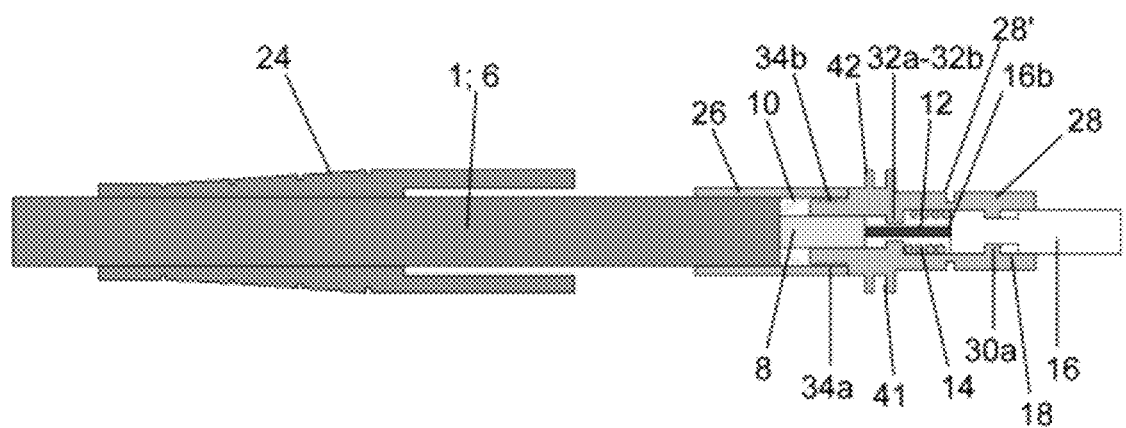
FIG. 9 depicts a second configuration of a cable assembly in the end position.
Figure 10:
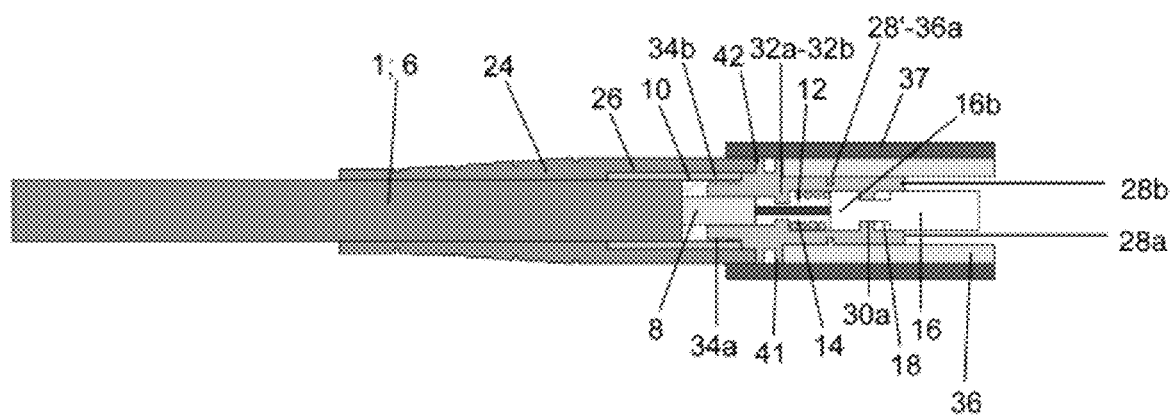
FIG. 10 depicts a third configuration of a cable assembly in the end position.

Each sleeve element 28a-28b—depicted in FIG. 8 as sleeve housing elements—is provided with a first inwardly oriented cam 30a-30b, which, upon placement around the connecting element 16, extends into the recess 18 of the connecting element 16. See FIGS. 8-10. As shown in FIG. 9 and FIG. 10, the length of the recess 18 is greater than the length of the first cam 30a-30b (as measured in the longitudinal direction of the cable 1).

Furthermore, the connector sleeve 28 (i.e., the two sleeve housing elements 28a-28b) is provided with a second inwardly oriented cam 32a-32b that is spaced from the first inwardly oriented cam 30a-30b. The second inwardly oriented cam 32a-32b engages the spring element 14. The spring element 14 is thus retained between the second cam 32a-32b and the back-end face 16b of the connecting element 16. This manner of retaining the spring element 14 (in conjunction with the larger dimension of the recess 18 in comparison with the first cam 30a-30b that extends into the recess 18) enables a slight degree of compression of the connecting element 16 as a result of the action of the spring element 14 when longitudinal forces are exerted thereon. In this way, the optical fiber 12 is not subjected to loads that may adversely affect it.

As depicted in FIG. 9, the strain-relieving sheath/element 10, which, for instance, may be made of aramid fibers formed around the surfaces 34a-34b, is provided with a screw, a knurled edge, or other friction-increasing surface. The strain-relieving sheath 10 is thus clamped onto the surfaces 34a-34b of the two sleeve housing elements 28a-28b by the shrink sleeve 26. In this way, a good strain-relieving connection between the communication connector 2 and the outer sheath 6a is realized. The kink protector 24 can be slid in the direction of the communication connector 2, so that it protects the shrink sleeve 26 and abuts a first upwardly oriented cam 42 provided on each sleeve housing element 28a-28b.

As depicted in FIG. 10, the free end of the connecting element 16 projecting from the connector sleeve 28 is further protected by way of a protective sleeve 36, which is provided with an inwardly oriented cam 36a. The inwardly oriented cam 36a precisely fits in the circular recess 28' formed in the external surface of the connector sleeve 28. The protective sleeve 36 thus abuts outwardly oriented cam 41, which forms part of each sleeve housing element 28a-28b. The final assembly of the communication connector 2 is completed by the provision of a connector envelope 37, which can be slid over the protective sleeve 36, the upright cams 41-42, and the kink protector 24.

Figure 11:
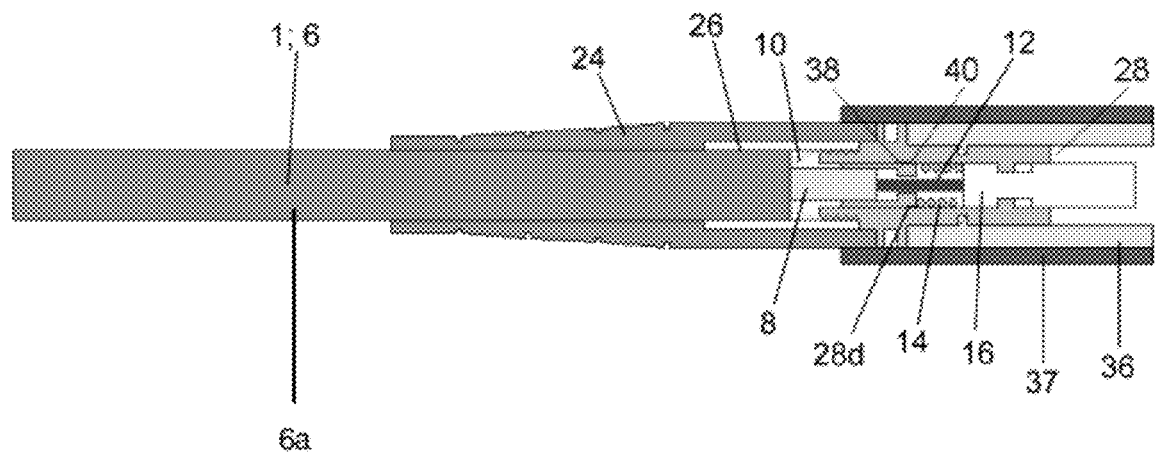
FIG. 11 depicts another embodiment of a cable assembly in the end position.

FIG. 11 depicts a cable assembly that includes a one-piece sleeve housing element 28 (but is otherwise similar to that depicted in FIG. 10). After positioning the one-piece sleeve housing element 28, the spring element 14 is loaded by pushing ring 38 (previously placed in the semi-finished assembly) into the sleeve housing element 28. Ring 38 snaps into place using recession 40.

In contrast to the embodiments shown in FIGS. 6-11, FIG. 12 discloses yet another embodiment of a semi-finished cable assembly 1 in which the spring element 14 is not arranged around the optical fiber (not shown). Rather, spring element 14 is provided around element portion 43a between the connecting element 16 and the cable sheath 6a. As is depicted in the cross-sectional view of FIG. 12, the intermediate element 43 has a hexagonal outer circumference, around which the sleeve elements 28a-28b (not shown) can be clamped. Because of this surface configuration, sliding or rotating movement is not possible and there is no need for a cam-recess configuration.

Figure 12:
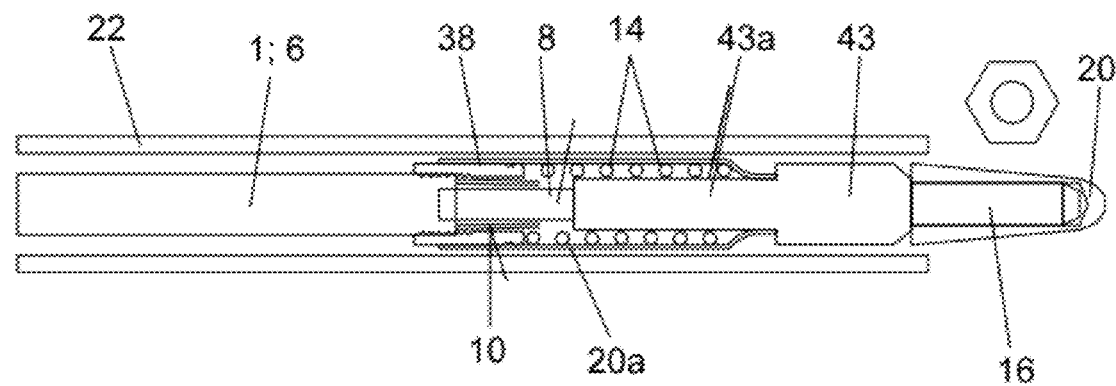
FIG. 12 depicts yet another embodiment of a semi-finished cable assembly.

In the embodiment depicted in FIG. 12, the connecting element 16 is protected by a protective element 20, while the spring element 14 and the ring 38 are protected by a protective retaining sleeve 20a. The ring 38 is disposed between the spring element 14 and the sheaths 6a, 8, 10 and is provided with internal screw thread for being fitted around the sheath 6a. The ring 38 functions to hold the protective retaining sleeve 20a in place. This construction results in a semi-finished cable assembly having a reduced external diameter, which makes it easier to pass the assembly through a cable guide 22.

In another embodiment, the protective retaining sleeve 20a and the protective element 20 may be configured as one unit, which may have a slightly larger external diameter. A ring 38 may be provided between the spring element 14 (i.e., its upright, circular edge) and the sheaths 6a, 8, 10. See FIG. 11. After the semi-finished cable assembly 1 has been moved to the end position and the kink protector 24 and the shrink sleeve 26 have been provided, the ring 38 is pressed down in the connector sleeve 28. As a result, the spring element 14 is biased. The ring 38 fits in a recess 28d formed in the inner circumference defined by the sleeve housing elements 28a-28b.

Figure 13:
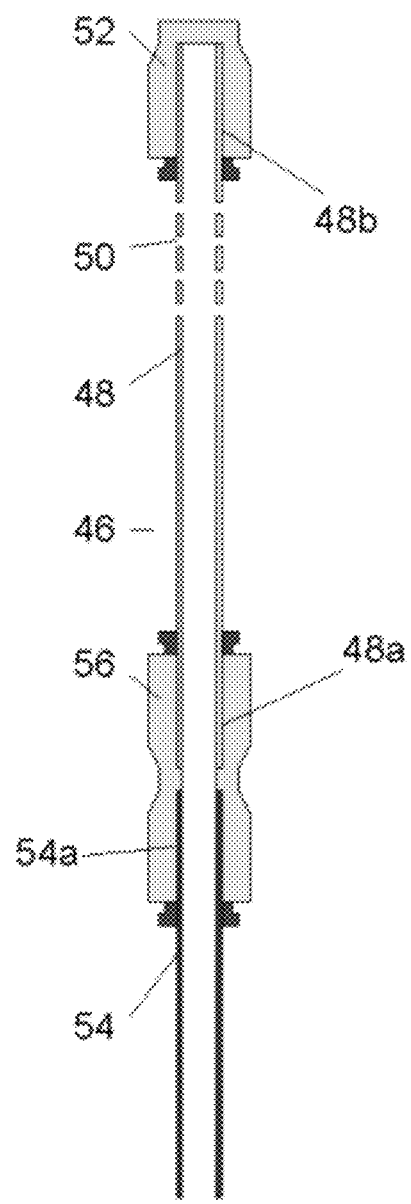
FIG. 13 depicts a device for collecting the free, front end of a communication cable assembly.
Figure 14:
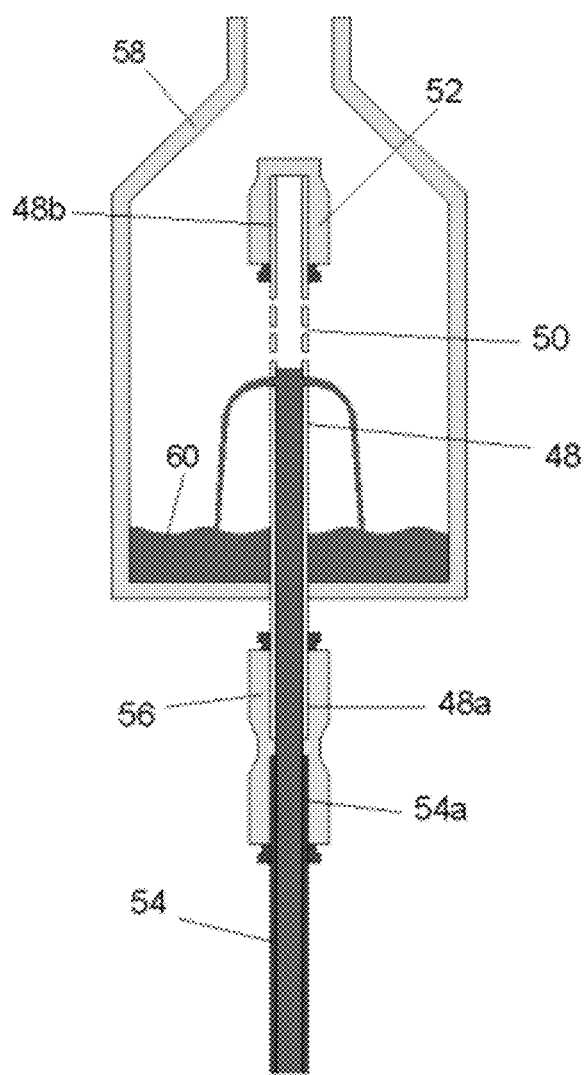
FIG. 14 depicts a device for collecting both the free, front end of a communication cable assembly and installation transfer fluid.

FIGS. 13 and 14 disclose a device 46 for collecting the front end of the pre-ferrulized cable assembly according to the present invention. The pre-ferrulized cable assembly is passed through a cable guide 54, which ends (e.g., terminates), for example, at the home of an end user. The pre-ferrulized cable assembly is passed through the cable guide 54 using a transfer medium (e.g., pressurized air or liquid) from a starting position to an end position 54a, which is typically located inside the end user's home.

In this regard, the device 46 includes an enclosure 48, which is to be provided at (e.g., positioned around) the end position 54a of the cable guide 54. The enclosure 48 is provided with one or more ventilation openings 50 that allow the passage of the transfer medium (e.g., pressurized air or liquid) out of the enclosure when passing the pre-ferrulized cable assembly through the cable guide 54.

The enclosure 48 is typically configured to be tube-shaped, having a first open end 48a and a second open end 48b, wherein the first open end 48a is provided with a collar 56 for coupling with the end position 54a of the cable guide 54. As depicted in FIGS. 13 and 14, the collar 56 is a collar-shaped clamp secured to the cable guide 54. The second open end 48b is provided with a closure cap 52.

As depicted in FIG. 14, the foregoing device 46 may further include a collecting chamber 58, in which the enclosure 48 is accommodated. The collecting chamber 58 serves to collect the liquid transfer fluid 60 that is used for passing the pre-ferrulized cable assembly through the cable guide 54.

The semi-finished cable assemblies disclosed herein are sized to facilitate a proper and unhampered displacement of a semi-finished cable assembly through the cable guide 54, even passing sharp bends in the cable guide 54.

The exemplary embodiments of the semi-finished cable assembly shown in FIGS. 6-10 may be provided with a connecting element 16 having a diameter of about 1.25 millimeters. The cable 6 has a diameter of about 1.8 millimeters, whereas the protective element 20 is about 13 millimeters long and has a maximum diameter of about 2.2 millimeters.

Yet another exemplary embodiment embraces a cable 6 having a diameter of about 1.8 millimeters with connecting element and a protective element 20 having a length of about 20.5 millimeters and a maximum diameter of about 2.85 millimeters. This semi-finished cable assembly can be blown through a cable guide 22 having a diameter ratio of about 5/3.5 (e.g., having an outside diameter of about 5 millimeters and inside diameter of about 3.5 millimeters).

The exemplary embodiment depicted in FIG. 12 has a reduced diameter as it uses two protective elements (i.e., element 20 placed over the connecting element 16 and protective retaining sleeve 20a placed over the rear assembly). The protective sleeve 20a can be made of soft material (e.g., a heat shrinkable plastic tube) that can later be easily cut away or otherwise removed. The cable 6 has a diameter of 1.8 millimeters and protective element 20 has a length of 20.5 millimeters and a maximum diameter of 2.65 millimeters. The semi-finished cable assembly can be blown through a cable guide 22 having an outside diameter of about 4 millimeters and inside diameter of about 3 millimeters.

This configuration, without the protective sleeve 20a, has been tested by blowing in a 1030-meter trajectory with 180° bends with radius of 15 cm placed every 100 meters. With a blowing pressure of 10 bar, the speed at the end was still 14 meters per minute, reducing to 13 meters per minute when the connecting element 16 emerged from (i.e., exited) the cable guide 22. This indicates that no negative blowing effects—there was, in fact, a small positive effect—were found when installing with a semi-finished connector.

Yet another exemplary embodiment embraces a cable 6 having a diameter of about 1.8 millimeters with a protective element 20 having a length of about 18.5 millimeters and a maximum diameter of about 3.25 millimeters. This semi-finished cable assembly can be blown through a cable guide 22 having a diameter ratio of about 5/3.5 (e.g., having an outside diameter of about 5 millimeters and inside diameter of about 3.5 millimeters). It is preferable, however, to use a cable guide having a larger diameter (e.g., an outside diameter of about 7 millimeters and inside diameter of about 5.5 millimeters).

\* \* \*

Tests with other prototypes were carried out to determine the installation viability of a semi-finished cable assembly. For example, tests with prototypes of the semi-finished (1.25-mm) cable assemblies were performed. It was observed that blowing was possible at 10 bar in a cable guide having an outside diameter of about 4 millimeters and inside diameter of about 3 millimeters (e.g., having a millimeter diameter ratio of about 4/3) in a standard IEC 60794-5-10, 1000-meter trajectory including 180° bends with bend radius of 160 millimeters every 100 meters and a Y-branching duct-connector close to the termination box. There was no loss in performance when compared to blowing a communication cable without a semi-finished connector attached to it. At the end of trajectory, a section of cable guide of a defined length (terminated with air-venting and end-stop) was placed and the cable came to a full stop automatically when the cable reached the end-stop. The defined length was chosen such that the finished connectorized cable matches the length needed in the termination box. The final assembly of the communication cable was accomplished without any problems.

The following examples describe testing of the various semi-finished cable assemblies:

EXAMPLES

For testing various cables assemblies, a microduct (i.e., cable guide) having a length of 100 meters and an outside diameter of about 4 millimeters and an inside diameter of about 3 millimeters (e.g., having a millimeter diameter ratio of about 4/3) was laid on the ground in 10-meter loops. Each loop included a 180° bend with a bend radius of about 20 centimeters. At around 50 meters (i.e., about midway through the microduct), a sharper bend was made with the microduct in a bench vice, in which the bend radius (twice the plate-distance inside the bench vice) could be varied. (In this regard, the bend radius in two-point bending is a little less than half the plate distance.) Each cable assembly was blown using a MicroJET EM-25 with an air pressure of 10 bar and the magnetic clutch at position 4 (i.e., with a 15 N pushing force).

First, a bare cable with a short conical end-cap was tested through the aforementioned microduct. The cable passed a minimum bend radius of 35 millimeters without speed reduction, reaching the end of the microduct with the speed unchanged at 46 m/min.

Second, a semi-finished cable assembly (i.e., cable and semi-finished connector but without suction plug) was tested through the aforementioned microduct. The rigid, semi-finished connector had a length of 22 millimeters and a diameter of 2.2 millimeters. The semi-finished cable assembly could pass a minimum bend radius of about 75 millimeters, with the same unchanged speed. This result is in accordance with the equation used to calculate the $R_b$ value noted previously.

Figure 15:
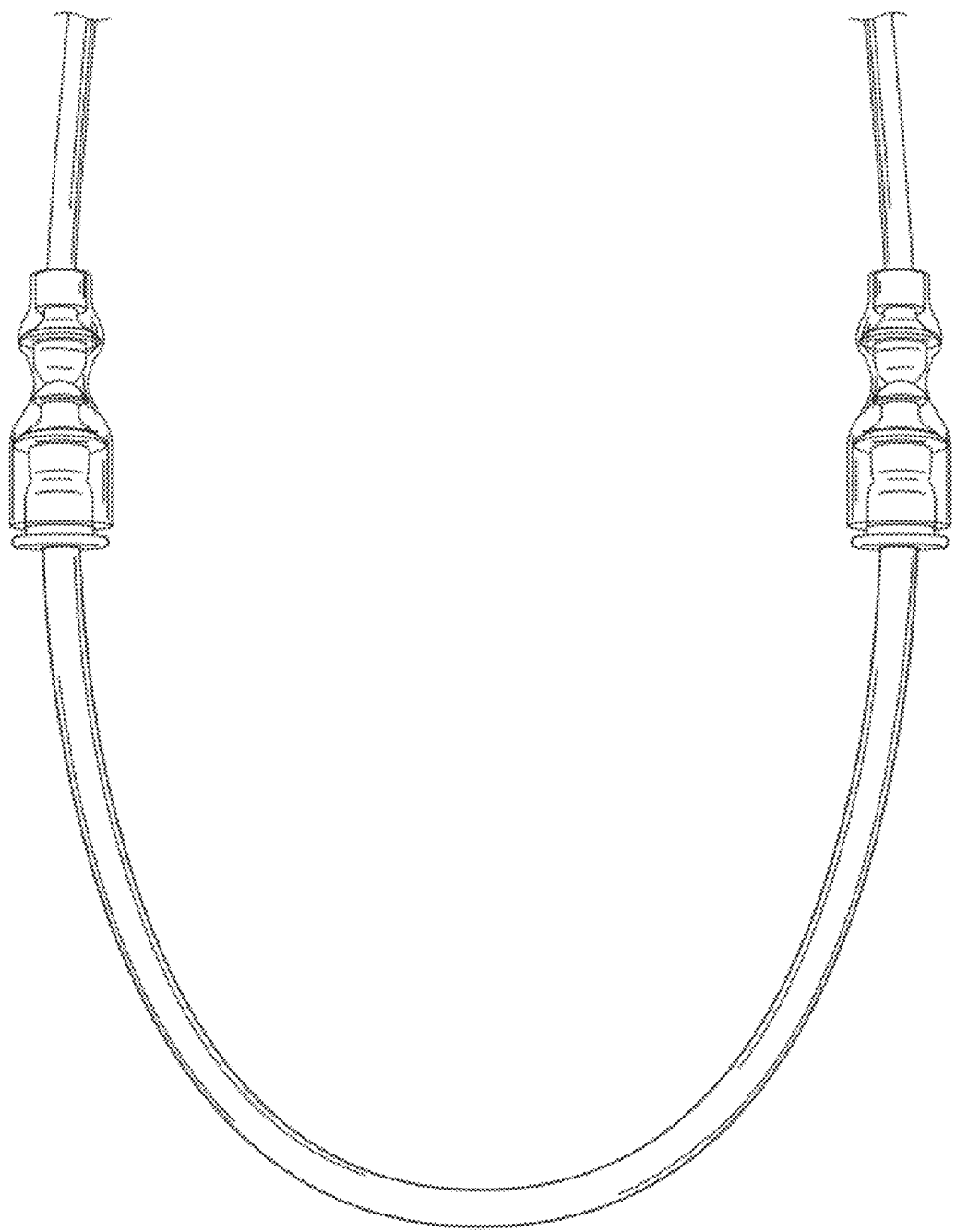
FIG. 15 illustrates a larger-diameter cable guide section installed between narrower cable guide sections to facilitate the passage of a semi-finished cable assembly.

Third, a semi-finished cable assembly (i.e., cable and semi-finished connector but without suction plug) was tested through a bent microduct having an outside diameter of about 5 millimeters and inside diameter of about 3.5 millimeters (e.g., having a millimeter diameter ratio of about 5/3.5). The rigid, semi-finished connector had a length of 22 millimeters and a diameter of 2.2 millimeters. As depicted in FIG. 15, this 5/3.5 section was positioned between cable guide sections having an outside diameter of about 4 millimeters and inside diameter of about 3 millimeters (e.g., having a millimeter diameter ratio of about 4/3). Although the placement of a larger-diameter cable guide section facilitates the passage of the semi-finished cable assembly through sharp bends, here the minimum bend radius achieved was 55 millimeters. This is slightly larger than predicted in theory (i.e., the $R_b$ value equation), perhaps due to the relatively high stiffness of the microduct having a millimeter diameter ratio of about 5/3.5.

Fourth, a prototype pre-ferrulized cable assembly according to the present invention (i.e., a cable, semi-finished connector, and a suction plug) was tested through the aforementioned microduct. See FIG. 4. Because no commercial suction plug of the right size was available for the test, an improvised foam-plug was attached using aramide yarn to an end cap that was positioned on the ferrule (i.e., the semi-finished connector). The substantially rigid portion of the pre-ferrulized cable assembly (i.e., essentially the semi-finished connector and its protective cap) had a length of 22 millimeters and a diameter of 2.2 millimeters. See FIG. 3C. The foam plug, which was capable of pulling as much as 7 N when 10 bar air pressure was used, forced the pre-ferrulized cable assembly through the bent microduct, while temporarily deforming the microduct locally. The ability of the foam plug to cause meaningful deformation of the microduct was unexpected. See FIG. 5. The smallest bend radius reached without speed reduction was 40 millimeters. At a bend radius of 35 millimeters, the ferrule became stuck but, after a few seconds, the pressure behind the foam plug increased. Thereafter, the ferrule once again started to move and reached the end of the microduct at full speed. It is believed that the pre-ferrulized cable assembly according to the present invention is capable of withstanding a pushing force of at least about 50 N.

The aforementioned test results demonstrate that a pre-ferrulized cable assembly of the present invention can pass through microducts having a millimeter diameter ratio of about 4/3 and 35-millimeter bend radius. This matches the installation performance (i.e., blowing performance) of a bare cable with short conical end-cap and significantly exceeds the installation performance of other semi-finished cable assemblies. In this way, the pre-ferrulized cable assembly of the present invention provides the blowing efficiency of a bare cable while retaining the final assembly advantages of semi-finished cable assemblies.

In the specification and the figures, typical embodiments of the invention have been disclosed. The present invention is not limited to such exemplary embodiments. Specific terms have been used only in a generic and descriptive sense, and not for purposes of limitation. The scope of the invention is set forth in the following claims.

The invention claimed is:

1. A method for installing a communication cable assembly, the cable assembly comprising a communication cable having a free, front end, wherein the cable includes at least an optical fiber that is coaxially surrounded by at least one cable sheath, the method comprising the steps of:

providing a cable guide having a starting point and an end point;

securing a plug assembly to the cable assembly;

guiding the cable assembly, using a transfer medium, with the optical fiber being exposed at the free, front end of the cable, the free, front end being fixedly surrounded by a connecting element from the starting point toward the end point, wherein the step of guiding the cable assembly through the cable guide comprises the plug assembly leading the cable assembly through a section of the cable guide that has (i) an inner diameter of 3 millimeters or less and (ii) a bend radius of less than 75 millimeters;

collecting the free, front end of the cable at the end point;

mechanically connecting the free, front end of the cable to a communication connector.

2. The method according to claim 1, wherein the plug assembly comprises a suction plug for guiding the cable assembly through the cable guide.

3. The method according to claim 2, wherein the plug assembly comprises a protective element for protecting the free, front end of the cable.

4. The method according to claim 1, wherein the step of guiding the cable assembly through the cable guide comprises the plug assembly leading the cable assembly through a section of the cable guide that has (i) a substantially constant inner diameter of 3 millimeters or less and (ii) a bend radius of less than 75 millimeters.

5. The method according to claim 4, wherein the plug assembly leads the cable assembly through a section of the cable guide having an outside diameter of about 4 millimeters or more.

6. The method according to claim 1, wherein the step of guiding the cable assembly through the cable guide comprises the plug assembly leading the cable assembly through a section of the cable guide that has (i) an inside diameter of about 3 millimeters or less and (ii) a bend radius of between about 35 millimeters and 55 millimeters.

7. The method according to claim 1, wherein the step of guiding the cable assembly through the cable guide comprises the plug assembly leading the cable assembly through a section of the cable guide that has (i) an inside diameter of about 3 millimeters or less and (ii) a bend radius of less than about 35 millimeters.

8. The method according to claim 1, wherein the step of guiding the cable assembly through the cable guide comprises the plug assembly leading the cable assembly through a section of the cable guide that has (i) a substantially constant inner diameter of about 3 millimeters or less and a substantially constant outer diameter of about 4 millimeters or more and (ii) a bend radius of between about 35 millimeters and 65 millimeters.

9. The method according to claim 1, wherein, during the step of guiding the cable assembly from the starting point toward the end point, the plug assembly causes localized deformations in the cable guide to facilitate movement of the cable assembly through the cable guide.

10. The method according to claim 1, wherein:

the cable assembly defines a substantially rigid portion; and the step of guiding the cable assembly from the starting point toward the end point comprises guiding the cable assembly through a cable guide bend that defines a bend radius that is less than the predicted minimum bend radius $R_b$ according to the following equation:

$$R_b = \frac{\left(\frac{1}{2}l\right)^2 + (D-d)^2}{2(D-d)}$$

wherein,

D is the inner diameter of the cable guide;

l is the maximum length of the substantially rigid portion of the cable assembly; and d is the maximum diameter of the substantially rigid portion of the cable assembly.

11. The method according to claim 1, wherein:

the cable assembly defines a substantially rigid portion; and the step of guiding the cable assembly from the starting point toward the end point comprises guiding the cable assembly through a cable guide bend that defines a bend radius that is less than about 75 percent of the predicted minimum bend radius $R_b$ according to the following equation:

$$R_b = \frac{\left(\frac{1}{2}l\right)^2 + (D-d)^2}{2(D-d)}$$

wherein,

D is the inner diameter of the cable guide;

l is the maximum length of the substantially rigid portion of the cable assembly; and d is the maximum diameter of the substantially rigid portion of the cable assembly.

12. The method according to claim 1, wherein:

the cable assembly defines a substantially rigid portion; and the step of guiding the cable assembly from the starting point toward the end point comprises guiding the cable assembly through a cable guide bend that defines a bend radius that is less than about 50 percent of the predicted minimum bend radius $R_b$ according to the following equation:

$$R_b = \frac{\left(\frac{1}{2}l\right)^2 + (D-d)^2}{2(D-d)}$$

wherein,

D is the inner diameter of the cable guide;

l is the maximum length of the substantially rigid portion of the cable assembly; and d is the maximum diameter of the substantially rigid portion of the cable assembly.

13. A method for installing a communication cable assembly, the cable assembly comprising a communication cable having a free, front end, wherein the cable includes at least an optical fiber that is coaxially surrounded by at least one cable sheath, the method comprising the steps of:

providing a cable guide having a starting point and an end point;

securing a plug assembly to the cable assembly;

guiding the cable assembly, using a transfer medium, with the optical fiber being exposed at the free, front end of the cable, the free, front end being fixedly surrounded by a connecting element from the starting point toward the end point, wherein the step of guiding the cable assembly through the cable guide comprises the plug assembly leading the cable assembly through a section of the cable guide that has (i) an inner diameter of 4 millimeters or less and (ii) a bend radius of less than 50 millimeters;

collecting the free, front end of the cable at the end point;

mechanically connecting the free, front end of the cable to a communication connector.

14. The method according to claim 13, wherein the step of guiding the cable assembly through the cable guide comprises the plug assembly leading the cable assembly through a section of the cable guide that has (i) a substantially constant inner diameter of about 3.5 millimeters or less and (ii) a bend radius of less than 50 millimeters.

15. The method according to claim 14, wherein the plug assembly leads the cable assembly through a section of the cable guide having an outside diameter of about 5 millimeters or more.

16. The method according to claim 13, wherein the step of guiding the cable assembly through the cable guide comprises the plug assembly leading the cable assembly through a section of the cable guide that has (i) a substantially constant inner diameter of about 4 millimeters or less and (ii) a bend radius of less than 35 millimeters.

17. The method according to claim 16, wherein the plug assembly leads the cable assembly through a section of the cable guide having an outside diameter of about 5 millimeters or more.

* * * * *